United States Patent [19]

Tera et al.

[11] Patent Number: 5,187,227
[45] Date of Patent: Feb. 16, 1993

[54] POLYCARBONATE RESIN COMPOSITION

[75] Inventors: Isao Tera, Tonami; Kohji Kato, Yamato; Makoto Yamamoto, Hiratsuka; Kazuto Hashimoto; Hitoshi Yasumura, both of Ichihara, all of Japan

[73] Assignees: Nippon Zeon Co., Ltd.; Idemitsu Petrochemical Co., Ltd., both of Tokyo, Japan

[21] Appl. No.: 713,119

[22] Filed: Jun. 10, 1991

[30] Foreign Application Priority Data

Jul. 6, 1990 [JP] Japan .................. 2-177561
Jul. 6, 1990 [JP] Japan .................. 2-177562

[51] Int. Cl.$^5$ ............ C08L 69/00; C08L 67/02; C08L 51/04
[52] U.S. Cl. ......................... 525/65; 525/67; 525/306; 525/902
[58] Field of Search ............... 525/65, 67, 306, 902

[56] References Cited

U.S. PATENT DOCUMENTS

| | | | |
|---|---|---|---|
| 4,607,079 | 8/1986 | Giles | 529/67 |
| 4,629,760 | 12/1986 | Liu | 525/67 |
| 4,831,082 | 5/1989 | Peascoe | 525/146 |
| 4,868,235 | 9/1989 | Muehlbach et al. | 525/67 |
| 4,966,942 | 10/1990 | Sasaki | 525/67 |

FOREIGN PATENT DOCUMENTS

| | | |
|---|---|---|
| 0111260 | 6/1984 | European Pat. Off. |
| 0297517 | 1/1989 | European Pat. Off. |
| 0312929 | 4/1989 | European Pat. Off. |
| 55-9435 | 3/1980 | Japan . |
| 57-26538 | 6/1982 | Japan . |
| 59-93748 | 5/1984 | Japan . |
| 62-37671 | 8/1987 | Japan . |

OTHER PUBLICATIONS

Derwent, "Weather and impact-resistant thermoplastic resin compsn.-comprises aromatic vinyl graft copolymer, polycarbonate and rigid thermoplastic resin", 86-078 223, abstract of JP-A-61 646.

Primary Examiner—David J. Buttner
Attorney, Agent, or Firm—Frishauf, Holtz, Goodman & Woodward

[57] ABSTRACT

A polycarbonate resin composition comprising (A) 100 parts by weight of a polycarbonate resin, and (B) 1 to 80 parts by weight of an acrylic ester graft copolymer. The acrylic ester graft copolymer is produced by grafting on 100 parts by weight of an acrylic ester copolymer produced by copolymerizing (i) 100 parts by weight of at least one acrylic ester monomer having 1 to 16 carbon atoms and (ii) 0.1 to 5 parts by weight of a polyfunctional allyl ester monomer and/or a polyfunctional methallyl ester monomer having a benzene ring as a skeleton; a copolymer of (iii) 15 to 100 parts by weight of (a) one or two vinyl monomers selected from the group consisting of a methacrylic ester, an aromatic monovinyl compound and a vinyl cyanide compound, and (b) an acrylic ester in an amount of 0 to 20% by weight to the vinyl monomer and (iv) 0.1 to 5 parts by weight of a polyfunctional allyl ester monomer and/or a polyfunctional methallylester monomer having a benzene ring as a skeleton. The polycarbonate resin may additionally contain 4 to 150 parts by weight of an aromatic polyester resin (C). The polycarbonate resin composition is excellent in low temperature impact resistance, thermal stability, solvent resistance and is useful as a molding material.

16 Claims, No Drawings

POLYCARBONATE RESIN COMPOSITION

BACKGROUND OF THE INVENTION

1. Field of the Invention

The present invention relates to a polycarbonate resin composition. More particularly, the present invention relates to a polycarbonate resin composition which is suitable for materials of molded products in industries of automobile or domestic electric appliances and has various excellent properties such as thermal stability, low temperature impact resistance, jet-black color property, solvent resistance suitable for such products.

2. Description of Related Arts

While a polycarbonate resin is known to have excellent mechanical strengths such as tensile strength, bending strength or impact strength, and thermal resistance and to be an engineering resin excellent in molding precision and has hitherto been used widely in a variety of fields, it has defects that low temperature impact resistance, solvent resistance, fluidity, etc. are inferior. For the purpose of solving these defects in a polycarbonate resin, there have been proposed compositions prepared by incorporating the polycarbonate resin with a polyester ether elastomer (Japanese Patent Publication No. 26538/1982) or with a polyester resin and an acrylic rubber (Japanese Patent Publication Nos. 9435/1980 and 37671/1987, Japanese Patent Application Laid-Open No. 93748/1984).

However, these compositions, with the improvement in solvent resistance and fluidity to some extent, have problems involving the insufficient improvement in low temperature impact resistance, the lowering of thermal stability or the lowering of jet-black color property (which produces the pearl colored appearance) and thus can be used only for limited applications. The lowering of thermal stability and the lowering of jet-black color property are considered to be due to elastomer components.

The present inventors have conducted earnest researches in order to solve the defects of conventional polycarbonate resin compositions having a polyester resin and an acrylic rubber incorporated therein and to provide a polycarbonate resin composition excellent in thermal stability, low temperature impact resistance, jet-black color property, solvent resistance or the like.

As a result, it has been found that the aforementioned purposes are successfully achieved by incorporating the polycarbonate resin with an aromatic polyester resin and an acrylic ester graft copolymer having a specific composition in a certain ratio. The present invention has been accomplished on the basis of such information.

SUMMARY OF THE INVENTION

The present invention provides a polycarbonate resin composition comprising (A) 100 parts by weight of a polycarbonate resin,
(B) 1 to 80 parts by weight of an acrylic ester graft copolymer comprising grafting, on 100 parts by weight of an acrylic ester copolymer which comprises copolymerizing (i) 100 parts by weight of at least an acrylic ester monomer having 1 to 16 carbon atoms and (ii) 0.1 to 5 parts by weight of a polyfunctional allyl ester monomer having a benzene ring as a skeleton and/or a polyfunctional methallyl ester monomer having a benzene ring as a skeleton, (iii) 15 to 100 parts by weight of at least a vinyl monomer selected from the group consisting of a methacrylic ester, an aromatic monovinyl compound and a vinyl cyanide compound and an acrylic ester in a proportion of 0 to 20% by weight to the vinyl monomer and (iv) 0.1 to 5 parts by weight of a polyfunctional allyl ester monomer having a benzene ring as a skeleton and/or a polyfunctional methallyl ester monomer having a benzene ring as a skeleton.

Furthermore, the present invention provides a polycarbonate resin composition comprising 100 parts by weight of said component (A), 1 to 80 parts by weight of said component (B) and (C) 4 to 150 parts by weight of an aromatic polyester resin.

DESCRIPTION OF PREFERRED EMBODIMENTS

The polycarbonate resin compositions of the present invention are, as described above, a composition of components (A) and (B) and a composition of components (A), (B) and (C).

In the present invention, the polycarbonate resin used as the component (A) is a polymer having a repeating unit represented by the general formula (I):

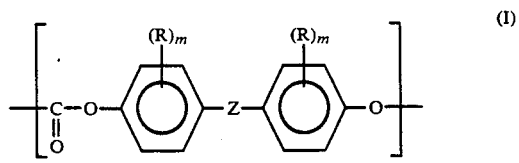

wherein Z is a single bond, an ether bond, an alkylene group having 1 to 8 carbon atoms, an alkylidene group having 2 to 8 carbon atoms, a cycloalkylidene group having 5 to 15 carbon atoms, a sulfonyl group, a carbonyl group or a group represented by the following formula:

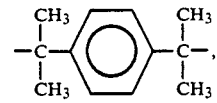

and R represents a hydrogen atom, a chlorine atom, a bromine atom or an alkyl group having 1 to 8 carbon atoms, and m denotes 0 or an integer of 1 to 4.

The polycarbonate resin can be prepared by the solvent method in which the reaction between a divalent phenol and a carbonate precursor such as phosgene or the transesterification between a divalent phenol and a carbonate precursor such as diphenyl carbonate in a solvent such as methylene chloride in the presence of a well-known acid acceptor and a molecular weight modifier is carried out.

In this connection, the divalent phenol which can be appropriately used includes bisphenols, particularly preferably 2,2-bis (4-hydroxyphenyl) propane (common name: bisphenol A). It may also be a bisphenol A, a part or the whole of which has been substituted by another divalent phenol. As the divalent phenol other than bisphenol A, there can be mentioned, for example, compounds such as a bis (4-hydroxyphenyl) alkane other than bisphenol A, hydroquinone, 4,4'-dihydroxydiphenyl, bis (4-hydroxyphenyl) cycloalkane, bis (4-hydroxyphenyl) sulfide, bis (4-hydroxyphenyl) sulfone, bis (4-hydroxyphenyl) sulfoxide or bis (4-hydroxyphenyl) ether; or halogenated bisphenols such as bis (3,5- dibromo-4-hydroxyphenyl) propane or bis (3,5-dichloro-4-hydroxyphenyl) propane.

These divalent phenols may be a homopolymer of a divalent phenol or a copolymer or blend of two or more divalent phenols.

Further, the polycarbonate resin used as the component (A) in the present invention may also be a thermoplastic random branched polycarbonate resin obtained by reacting a polyfunctional aromatic compound with a divalent phenol and/or a carbonate precursor.

It is desirable that the polycarbonate resin used in the present invention has a viscosity average molecular weight in the range of 10,000 to 100,000, preferably in the range of 20,000 to 40,000.

In the present invention, the acrylic ester graft copolymer used as the component (B) comprises a copolymer prepared by grafting, on 100 parts by weight of an acrylic ester copolymer which comprises copolymerizing (i) 100 parts by weight of at least an acrylic ester monomer having 1 to 16 carbon atoms and (ii) 0.1 to 5 parts by weight of a polyfunctional allyl ester monomer and/or a polyfunctional methallyl ester monomer having a benzene ring as a skeleton, (iii) 15 to 100 parts by weight of at least a vinyl monomer selected from the group consisting of a methacrylate ester, an aromatic monovinyl compound and a vinyl cyanide compound and an acrylic ester in a proportion of 0 to 20% by weight to the vinyl monomer and (iv) 0.1 to 5 parts by weight of polyfunctional allyl ester monomer and/or a polyfunctional methallyl ester monomer having a benzene ring as a skeleton. In other words, the component (B) comprises a copolymer prepared by graft-polymerizing monomers (iii) and (iv) on a copolymer obtained by copolymerizing monomers (i) and (ii).

As the acrylic acid monomer of the component (i) used for the preparation of the aforementioned component (B), there are mentioned, for example, ethyl acrylate, butyl acrylate, 2-ethylhexyl acrylate, n-octyl acrylate, isononyl acrylate, methoxyethyl acrylate, hydroxyethyl acrylate or the like, and these compounds may be used alone or in combination.

As the polyfunctional allyl (or methallyl) ester monomers having a benzene ring as a skeleton as a component (ii), there are mentioned, for example, diallyl (or methallyl) phthalate, diallyl (or methallyl) isophthalate, diallyl (or methallyl) terephthalate, triallyl (or methallyl) trimellitate, triallyl (or methallyl) trimesate, tetraally (or methallyl) pyromellitate or the like, and these compounds may be used alone or in combination. In this case, the aforementioned polyfunctional allyl (or methallyl) ester monomer is represent by the following formulae:

as the bifunctional monomer,

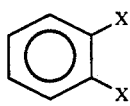

diallyl (or methallyl) phthalate,

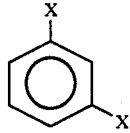

diallyl (or methallyl) isophthalate,

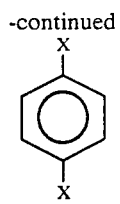

diallyl (or methallyl) terephthalate;
as the trifunctional monomer,

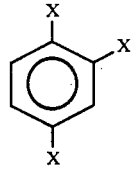

triallyl (or methallyl) trimellitate,

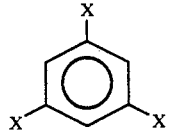

triallyl (or methallyl) trimesate;
as the tetrafunctional monomer,

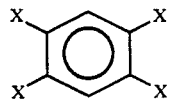

tetraallyl (or methallyl) pyromellitate, wherein X represents —COOCH$_2$CH=CH$_2$ or $$-COOCH_2\underset{\underset{CH_3}{|}}{C}=CH_2.$$

The component (ii) of the polyfunctional allyl (or methallyl) ester monomer having a benzene ring as a nucleus is required to be polymerized in a proportion of 0.1 to 5 parts by weight to 100 parts by weight of the acrylic acid monomer of the component (i). If the component (ii) is less than 0.1 part by weight, it exhibits an insufficient effect of its incorporation. If it is in an amount of more than 5 parts by weight, low temperature impact resistance is not improved, so that it is preferable in an amount of 2 parts by weight or less.

In order to prepare the component (B) used in the present invention, the components (iii) and (iv) are grafted on the acrylic ester copolymer obtained by polymerizing the components (i) and (ii) in the aforementioned ratio.

In this connection, there are used 15 to 100 parts by weight of at least one vinyl monomer selected from the group consisting of an methacrylic ester, an aromatic vinyl compound and a vinyl cyanide compound and an acrylic ester in a proportion of 0 to 20% by weight to the vinyl monomer. As the methacrylic ester, there are mentioned, for example, methyl methacrylate, ethyl methacrylate, butyl methacrylate, methoxyethyl methacrylate, glycidyl methacrylate and the like. The aromatic monovinyl compound includes, for example, styrene, α-methylstyrene, vinyltoluene, vinylxylene, a halogenated styrene and the like, and the vinyl cyanide compound includes, for example, acrylonitrile, methacrylonitrile and the like. While the monomers in this group are mainly used as the component (iii), an acrylic ester may be added thereto in an amount of 20% by weight or less.

As the acrylic ester used as the vinyl monomer of the component (iii), there are mentioned those described in the aforementioned acrylic esters. When the acrylic ester is used as a main component of the component (iii), the graft copolymer obtained exhibits poor dispersion into the polycarbonate resin. The acrylic ester, however, exhibits an improved effect on the fluidity of a molten graft copolymer when it is used within the aforementioned amount.

The vinyl monomer components are grafted in a proportion of 15 to 100 parts by weight, preferably 20 to 50 parts by weight to 100 parts by weight of the acrylic ester copolymer. If the component (iii) is in an amount of less than 15 parts by weight, the graft copolymer obtained has defects that its dispersion in the resin composition of the present invention is poor and the jet-black color property and the appearance are also deteriorated. If the component (iii) is in an amount of more than 100 parts by weight, the impact resistance of the resin composition as a final product is lowered.

In the present invention, the polyfunctional allyl (or methallyl) ester monomer having a benzene ring as a skeleton as the component (iv) is further grafted in a proportion of 0.1 to 5 ports by weight to the aforementioned acrylic ester copolymer. In this case, the monomer used as the component (iv) is the same as the component (ii) described above. If the component (iv) is in an amount of less than 0.1 part by weight, there occurs a problem that the solvent resistance of the final resin composition is lowered. If it is in an amount of more than 5 parts by weight, there occurs a disadvantage that the low temperature impact resistance is lowered.

The acrylic ester graft copolymer used as the component (B) in the present invention can be prepared by a well-known method such as bulk polymerization, suspension polymerization, emulsion polymerization or the like, using the acrylic ester copolymer comprising the acrylic ester monomer of the component (i) and the polyfunctional allyl (or methallyl) ester monomer of the component (ii), the vinyl monomer of the component (iii) and the polyfunctional allyl (or methallyl) ester monomer having a benzene ring as a skeleton of the component (iv) in a ratio described above. Among these polymerization methods, emulsion polymerization is particularly preferred.

The particle diameter of the acrylic ester graft copolymer thus obtained is not critical, but it is preferable in the range of 0.1 to 0.3 μm in view of the low temperature impact resistance and the jet-black color property of the resin composition obtained.

In the polycarbonate resin composition of the present invention comprising the components (A) and (B), the component (B) is incorporated in a proportion of 1 to 80 parts by weight, preferably 2 to 60 parts by weight to 100 parts by weight of the component (A). If the component (B) is in an amount of less than 1 part by weight, the low temperature impact resistance is not improved. If the amount of the component (B) exceeds 80 parts by weight, the jet-black color property and the rigidity are lowered.

In the present invention, there is also provided a polycarbonate resin composition comprising incorporating an aromatic polyester resin as a component (C) into the components (A) and (B). As the aromatic polyester resin, there can be used a variety of compounds, preferably a polyester resin which is obtained by polycondensation of a bifunctional carboxylic acid component and an alkylene glycol component.

In this connection, the bifunctional carboxylic acid component includes aromatic dicarboxylic acids such as terephthalic acid, isophthalic acid, naphthalene dicarboxylic acid and the like. Among these dicarboxylic acids, terephthalic acid is preferred. The other bifunctional carboxylic acid components can also be used so long as the effect of the present invention is not impaired. The typical examples of the other bifunctional carboxylic acid include aliphatic dicarboxylic acids such as oxalic acid, malonic acid, adipic acid, suberic acid, azelaic acid, sebacic acid, decanedicarboxylic acid and the like and ester forming derivatives thereof. The dicarboxylic acid component other than aromatic dicarboxylic acids should be incorporated generally in a proportion of 20% or less to the amount of the total dicarboxylic acids.

The alkylene glycol component is not critical, but specifically aliphatic diols having 2 to 15 carbon atoms such as ethylene glycol, propylene-1,2-glycol, propylene-1,3-glycol, butylene-1,4-glycol, butylene-2,3-glycol, hexane-1,6-diol, 1,4-cyclohexanedimethanol, octane-1,8-diol, neopentyl glycol, decane-1, 10-diol and the like can be used. Among these diols, ethylene glycol, 1,4-cyclohexane dimethanol and butylene glycol are preferred.

As the polyester resins, polyethylene terephthalate, polybutylene terephthalate, polycyclohexane terephthalate and the like are particularly preferred.

The aromatic polyester resin as the component (C) can be prepared by a conventional method in the presence or absence of a polycondensation catalyst containing titanium, germanium, antimony or the like. Polyethylene terephthalate is usually prepared, for example, by the reaction comprising the first step in which terephthalic acid and ethylene glycol are subjected to esterification reaction or a lower alkyl ester of terephthalic acid such as dimethyl terephthalate and ethylene glycol are subjected to transesterification to obtain a glycol ester of terephthalic acid and/or a low polymer thereof and the second step in which the glycol ester and/or a low polymer thereof are further polymerized to give a polymer having a high polymerization degree.

In the polycarbonate resin composition of the present invention, it is necessary to incorporate 4 to 150 parts by weight, preferably 10 to 100 parts by weight of the aromatic polyester resin of the component (C) to 100 parts by weight of the polycarbonate resin of the component (A). If the amount of the aromatic polyester resin is less than 4 parts by weight, the solvent resistance of the resin composition is not improved. If the amount exceeds 150 parts by weight, the low temperature impact resistance is lowered.

The polycarbonate resin composition of the present invention basically comprises the components (A) and (B) or the components (A) to (C), and the composition may contain an epoxy resin as a component (D). The epoxy resin used herein is a polycondensate comprising an aromatic diol and an epihalohydrin, particularly a polycondansate comprising bisphenol A and epichlorohydrin, which has an epoxy equivalent in the range of 500 or more, preferably 1000 or more. The impact resistance can be further improved by the addition of the component (D). The component (D) is incorporated in a proportion of 0.01 to 10 parts by weight, preferably 0.05 to 5 parts by weight to 100 parts by weight of the component (A). If the amount is less than 0.05 part by weight, the impact resistance of the composition is improved insufficiently. If the amount exceeds 10 parts, the thermal stability is deteriorated and the composition can be not molded.

In the polycarbonate resin composition of the present invention, inorganic fillers, miscellaneous additives, other synthetic resins, elastomers and the like, if necessary, can be incorporated in such amount that the purpose of the present invention is not impaired.

The inorganic fillers are incorporated in order to improve the mechanical strength or the durability of the polycarbonate resin composition and include, for example, glass fibers, glass beads, glass flakes, carbon black, calcium sulfate, calcium carbonate, calcium silicate, titanium oxide, alumina, silica, asbestos, talc, clay, mica, quartz and the like.

As the aforementioned miscellaneous additives, there are mentioned anti-oxidizing agents, for example, hindered phenol type anti-oxidizing agents, phosphorus type anti-oxidizing agents such as a phosphite, a phosphate or the like, or amine type anti-oxidizing agents; UV absorbers such as benzotriazoles, benzophenones or the like; external lubricating agents such as aliphatic carboxylates, paraffins or the like; conventional flame-retardants; mold release agents; antistatic agents; colorants and the like.

As the hindered phenol type anti-oxidizing agents, there are preferably used, for example, 2,6-di-tert-butyl-p-cresol (BHT), Irganox 1076 (CIBA-GEIGY CO., trade name), Ethyl 330 (ETHYL CO., trade name), Sumilizer GM (SUMITOMO CHEMICAL CO., LTD., trade name) or the like.

As the aforementioned phosphorus type anti-oxidizing agents, there are used Sumilizer TNP (SUMITOMO CHEMICAL CO., LTD., trade name), Mark PEP36 (ADEKA ARGARS CO., trade name), Irgaphos 168 (CIBA-GEIGY CO., trade name) or the like, and these agents may be combined with the hindered phenol type anti-oxidizing agents.

As the other synthetic resins, there are mentioned, for example, polyethylene, polypropylene, polystyrene, an AS resin, an ABS resin, polymethyl methacrylate and the like. As the elastomers, there are mentioned, for example, an isobutylene-isoprene rubber, a styrenebutadiene rubber, an ethylene-propylene rubber, an acrylic elastomer and the like.

The polycarbonate resin composition of the present invention can be prepared by incorporating the aromatic polyester resin, the acrylic ester graft copolymer and, if necessary, the epoxy resin into the polycarbonate resin in a certain ratio and kneading them. The blending and kneading can be conducted by a conventional method with use of a ribbon blender, a Henschel mixer, a Banbury mixer, a drum tumbler, a single screw extruder, a twin screw extruder, a Cokneader, a multiple screw extruder or the like. Kneading is appropriately conducted at a heating temperature usually in the range of 250° to 300° C.

The polycarbonate resin composition thus obtained can be molded by various conventional molding methods such as injection molding, extrusion molding, compression molding, calender molding, rotary molding or the like to prepare molded products in automobile industry such as a bumper for automobiles or molded products in industry of domestic electrical appliances.

As described above, the polycarbonate resin composition of the present invention is excellent in low temperature impact resistance (Izod impact strength and Du Pont impact strength), thermal stability, solvent resistance and jet-black color property.

Thus, the polycarbonate resin composition of the present invention is suitable for a molding material used in the preparation of a variety of molded products such as automobile parts, parts for domestic electrical appliances or the like.

The present invention is illustrated in detail by the following Examples and Comparative Examples.

PREPARATION EXAMPLE 1

In an autoclave (1) were charged 170 parts by weight of deionized water and 0.2 part of potassium persulfate, and the atmosphere in the autoclave was sufficiently replaced with nitrogen gas. At the same time, 30 parts by weight of deionized water, 2 parts by weight of sodium laurylsulfate, 100 parts by weight of 2-ethylhexylacrylate, and 1 part by weight of triallyl trimellitate were charged in another autoclave (2), and were stirred to form an emulsion after the atmosphere in the autoclave was sufficiently replaced with nitrogen gas. 5 parts by weight of the emulsion were poured into the autoclave (1), and the mixture was heated to 65° C. and polymerized for 2 hours. Furthermore, the whole of the remaining monomer emulsion in the autoclave (2) was added continuously to the reaction mixture over a period of 6 hours to complete the polymerization.

Next, 100 parts by weight of deionized water, 0.01 part by weight of ferrous sulfate, 0.3 part by weight of sodium formaldehyde sulfoxylate and 0.1 part by weight of cumene hydroperoxide were added to the reaction mixture, and then the mixture of 30 parts by weight of methyl methacrylate and 0.3 part by weight of triallyl trimellitate was added continuously over a period of 3 hours to complete graft polymerization.

The graft copolymer latex thus obtained had an average particle diameter of 0.22 μm.

When the reaction was completed, the above latex was poured into a 1% by weight aqueous magnesium sulfate solution, coagulated, washed with water and dried to give an aimed graft copolymer. In the coagulation of the latex, Irganox 1076 (CIBA-GEIGY CO., trade name) which is a hindered phenol anti-oxidizing agent was added in a proportion of 1 part by weight to the polymer.

PREPARATION EXAMPLE 2

A graft copolymer was prepared in the same manner as in Preparation Example 1 except that 70 parts by weight of 2-ethylhexyl acrylate and 30 parts by weight of butyl acrylate were used in place of 100 parts by weight of 2-ethylhexyl acrylate.

PREPARATION EXAMPLE 3

In an autoclave (1) were charged 170 parts by weight of deionized water and 0.2 part of potassium persulfate, and the atmosphere in the autoclave was sufficiently replaced with nitrogen gas. At the same time, 30 parts by weight of deionized water, 2 parts by weight of potassium oleate, 100 parts by weight of 2-ethylhexyl acrylate and 1 part by weight of diallyl phthalate were charged in another autoclave (2), and were stirred to form an emulsion after the atmosphere in the autoclave was sufficiently replaced with nitrogen gas. 5 parts by weight of the emulsion were poured into the autoclave (1), and the mixture was heated to 65° C. and polymerized for 2 hours. Furthermore, the whole of the remaining monomer emulsion in the autoclave (2) was added continuously to the reaction mixture over a period of 6 hours to complete the polymerization.

Next, 100 parts by weight of deionized water, 0.01 part by weight of ferrous sulfate, 0.3 part by weight of sodium formaldehyde sulfoxylate and 0.1 part by weight of cumene hydroperoxide were added to the reaction mixture, and then the mixture of 10 parts by weight of acrylonitrile, 30 parts by weight of styrene and 0.3 part by weight of diallyl phthalate was continuously added over a period of 3 hours to complete graft polymerization.

The graft copolymer latex thus obtained had an average particle diameter of 0.24 μm. When the reaction was completed, the latex was poured into a 1% by weight aqueous magnesium sulfate solution, coagulated, washed with water and dried to give an aimed graft copolymer. In the coagulation of the latex, Irganox 1076 (CIBA-GEIGY CO., trade name) which is a hindered phenol anti-oxidizing agent was added in a proportion of 1 part by weight to the polymer.

PREPARATION EXAMPLE 4

Comparative Example

A graft copolymer was prepared in the same manner as in Preparation Example 1 except that divinylbenzene was used in the same amount as triallyl trimellitate in Preparation Example 1.

PREPARATION EXAMPLE 5

Comparative Example; Preparation of isoprene type graft copolymer

In an autoclave (1) were charged 200 parts by weight of deionized water, 3 parts of sodium laurylsulfate, 0.3 part by weight of potassium persulfate and 0.2 part by weight of sodium carbonate, and the atmosphere in the autoclave was sufficiently replaced with nitrogen gas. Then, 100 parts by weight of isoprene was poured into the autoclave, heated to 50° C. and polymerized for 60 hours. Next, 80 parts by weight of deionized water, 0.01 part by weight of ferrous sulfate, 0.3 part by weight of sodium formaldehyde sulfoxylate and 0.1 part by weight of cumene hydroperoxide were added to the reaction mixture, dissolved and mixed, and then 40 parts by weight of methyl methacrylate was continuously added over a period of 4 hours under maintaining 50° C. The polymerization was further conducted for 3 hours to complete graft polymerization. The graft copolymer latex after the reaction was poured into a 0.1% by weight aqueous aluminium sulfate solution and coagulated. In the coagulation of the latex, Irganox 1076 (CIBA-GEIGY CO., trade name) which is a hindered phenol anti-oxidizing agent was added in a proportion of 0.5 part by weight to the polymer.

The rubber coagulated was washed with water and dried to give a graft copolymer having an average diameter of 0.22 μm.

EXAMPLES 1 to 8 and COMPARATIVE EXAMPLES 1 to 6

With 100 parts by weight of a polycarbonate (trade name; TOUGHLON A3000, viscosity average molecular weight: 29,200, IDEMITSU PETROCHEMICAL CO., LTD.) were blended prescribed amounts (parts by weight) of the components shown in Table 1, and the mixture was molten and kneaded with a single screw extruder NVC-50 mm φ (NAKATANI KIKAI K.K.) at a cylinder temperature of 260° C. to give pellets. These pellets were dried preliminarily at 120° C. for 5 hours or more and injection-molded (at a cylinder temperature of 280° C.) to give various molded products with which physical properties of the compositions were determined.

The polycarbonate resin compositions were evaluated by the following methods, and the results are shown in Table 1.

EXAMPLES 9 to 22

With 100 parts by weight of a polycarbonate (trade name; TOUGHLON A3000, viscosity average molecular weight, 29,200, IDEMITSU PETROCHEMICAL CO., LTD.) were blended certain amounts (parts by weight) of the components shown in Table 2, and the mixture was molten and kneaded with a single screw extruder NVC-50 mm φ (NAKATANI KIKAI K.K.) at a cylinder temperature of 260° C. to give pellets. These pellets were dried preliminarily at 120° C. for 5 hours or more and injection-molded (at a cylinder temperature of 280° C.) to give various molded products with which physical properties of the compositions were determined.

The polycarbonate resin compositions were evaluated by the following methods, and the results are shown in Table 2.

COMPARATIVE EXAMPLES 7 to 15

With 100 parts by weight of a polycarbonate (trade name: TOUGHLON A3000, viscosity average molecular weight: 29,200, IDEMITSU PETROCHEMICAL CO., LTD.) were blended certain amounts (part by weight) of the compound shown in Table 2. Various molded products, with which physical properties of the compositions were determined, were prepared in the same manner as in the above Examples.

The polycarbonate resin compositions were evaluated by the following methods, and the results are shown in Table 3.

Evaluation methods (a) Izod impact strength

Measurement was conducted in accordance with ASTM D 256 (measuring temperature: −30° C.).

(b) Du Pont impact strength

Injection molded square plate, 80×80×3 mm, were employed, and the test was conducted at −30° C. with a load of 2 kg, a dirt diameter of 1/16 inches φ and n=10. The height (cm) at which all of the samples showed ductile fracture was measured.

(c) Bending strength

Measurement was conducted in accordance with ASTM D 790.

(d) Thermal stability

After the sample was stayed for 15 minutes within a melt indexer at 300° C., the state of the strand extruded was judged by observation with naked eyes.

○: good,

Δ: a little foaming or discoloration,

X: vigorous foaming or discoloration.

(e) Jet-black color property

To 100 parts by weight of the composition was added 0.3 part by weight of carbon black, and the injection molding was conducted to prepare a plate having a size of a length of 80 mm, a width of 80 mm and a thickness of 3.2 mm, and the appearance was judged by observation with naked eyes.

○: a high black color level and a uniform color tone,
Δ: an ordinary black color level and a little irregularity in color tone,
X: a low black color level and an irregularity in color tone.

(f) Solvent resistance

Measurement was conducted in accordance with the ¼ ellipse method (Nakatsuji et al., SHIKIZAI, 39, 455, 1966).

Critical strain after dipping in a mixed solvent of toluene/isooctane/methanol=42.5/42.5/15 (% by volume) for 5 minutes was measured.

Materials employed in Examples and Comparative Examples are listed in the following:

MA523: Polyethylene terephthalate (MITSUBISHI RAYON CO., LTD., IV=0.78),
AA200: Polyethylene terephthalate (MITSUBISHI RAYON CO., LTD., IV=1.2),
N1300: Polybutylene terephthalate (MITSUBISHI RAYON CO., LTD., [η]=0.88 g/dl),
N1000: Polybutylene terephthalate (MITSUBISHI RAYON CO., LTD., [η]=1.06 g/dl),
A150: Poly(1,4-cyclohexandimethanol-terephthalate-co-isophthalate), EASTMAN-KODAK Kodal A-150,
Epoxy resin: EPICRON 9055 (DAINIPPON INK AND CHEMICALS, INC., bisphenol type epoxy resin)
KM330: Paraloid KM330 (ROHM & HASS CO., graft polymer in which styrene and methyl methacrylate have been grafted on an acrylic rubber)
PEP36: Phosphorus type anti-oxidizing agent (ADEKA-ARGAS CO., Mark PEP36)
W529: METABRENE W-529 (graft polymer in which styrene and methyl methacrylate have been grafted on an acrylic rubber, MITSUBISHI RAYON CO., LTD.).

TABLE 1

| | Formulation | | | | Test results | | | | |
|---|---|---|---|---|---|---|---|---|---|
| | (B) Acrylic ester graft copolymer | | Epoxy resin | | Izod impact strength | Bending. strength | Thermal stability | Solvent resistance | Jet-black color property |
| | Kind | Blended amount | Kind | Blended amount | kg·cm/cm (−30° C.) | kg/cm₂ | | | |
| Example 1 | Preparation Example 1 | 10 | — | 0 | 62 | 23000 | ○ | 0.51 | ○ |
| Example 2 | Preparation Example 2 | 10 | — | 0 | 60 | 23000 | ○ | 0.52 | ○ |
| Example 3 | Preparation Example 3 | 10 | — | 0 | 63 | 23000 | ○ | 0.51 | ○ |
| Example 4 | Preparation Example 1 | 5 | — | 0 | 55 | 24000 | ○ | 0.30 | ○ |
| Example 5 | Preparation Example 1 | 30 | — | 0 | 60 | 22000 | ○ | 0.75 | ○ |
| Example 6 | Preparation Example 1 | 50 | — | 0 | 61 | 20500 | ○ | 1 or more | ○ |
| Example 7 | Preparation Example 2 | 5 | Epoxy | 0.05 | 60 | 24500 | ○ | 0.35 | ○ |
| Example 8 | Preparation Example 1 | 10 | Epoxy | 1 | 67 | 23500 | ○ | 0.52 | ○ |
| Comparative Example 1 | KM330 | 5 | — | 0 | 30 | 24000 | x | 0.52 | x |
| Comparative Example 2 | KM330 | 30 | — | 0 | 60 | 21500 | x | 0.71 | x |
| Comparative Example 3 | W529 | 10 | — | 0 | 15 | 23000 | x | 0.45 | ○ |
| Comparative Example 4 | Preparation Example 1 | 100 | — | 0 | 50 | 15000 | ○ | 1 or more | x |
| Comparative Example 5 | Preparation Example 4 | 10 | — | 0 | 30 | 23000 | ○ | 0.51 | ○ |
| Comparative Example 5 | Preparation Example 1 | 10 | Epoxy | 15 | No molded product due to poor thermal stability | | | | |

TABLE 2

| | Formulation | | | | | | Test results | | | | |
|---|---|---|---|---|---|---|---|---|---|---|---|
| | (B) Acrylic ester graft copolymer | | (C) Aromatic polyester | | Other additives | | Izod impact strength | Du Pont impact strength | Thermal stability | Solvent resistance | Jet-black color property |
| | Kind | Blended amount | Kind | Blended amount | Kind | Blended amount | kg·cm/cm (−30° C.) | kg·cm (−30° C.) | | | |
| Example 9 | Preparation Example 1 | 10 | MA523 | 35 | — | 0 | 40 | 120 | ○ | 0.52 | ○ |
| Example 10 | Preparation Example 2 | 30 | MA523 | 70 | — | 0 | 47 | 140 or more | ○ | 0.65 | ○ |
| Example 11 | Preparation Example 3 | 30 | MA523 | 90 | — | 0 | 45 | 140 or more | ○ | 0.85 | ○ |
| Example 12 | Preparation Example 1 | 10 | AA200 | 35 | — | 0 | 42 | 130 | ○ | 0.53 | ○ |
| Example 13 | Preparation Example 1 | 30 | AA200 | 70 | — | 0 | 50 | 140 or more | ○ | 0.70 | ○ |
| Example 14 | Preparation | 30 | AA200 | 100 | — | 0 | 45 | 140 or | ○ | 0.90 | ○ |

TABLE 2-continued

| | Formulation | | | | | | Test results | | | | |
|---|---|---|---|---|---|---|---|---|---|---|---|
| | (B) Acrylic ester graft copolymer | | (C) Aromatic polyester | | Other additives | | Izod impact strength | Du Pont impact strength | Thermal stability | Solvent resistance | Jet-black color property |
| | Kind | Blended amount | Kind | Blended amount | Kind | Blended amount | kg · cm/cm (−30° C.) | kg · cm (−30° C.) | | | |
| Example 15 | Preparation Example 2 | 30 | N1300 | 50 | — | 0 | 50 | 140 or more | ○ | 0.62 | ○ |
| Example 16 | Preparation Example 1 | 40 | N1300 | 70 | PEP 36 | 0.5 | 55 | 140 or more | ○ | 0.75 | ○ |
| Example 17 | Preparation Example 1 | 10 | N1300 | 50 | — | 0 | 45 | 120 | ○ | 0.60 | ○ |
| Example 18 | Preparation Example 2 | 30 | N1000 | 100 | — | 0 | 50 | 140 or more | ○ | 1 or more | ○ |
| Example 19 | Preparation Example 3 | 20 | N1000 | 70 | — | 0 | 45 | 140 | ○ | 0.72 | ○ |
| Example 20 | Preparation Example 3 | 20 | N1000 | 70 | Epoxy resin | 0.1 | 50 | 140 | ○ | 0.73 | ○ |
| Example 21 | Preparation Example 1 | 30 | MA523 | 50 | Epoxy resin | 1.0 | 55 | 140 or more | ○ | 0.58 | ○ |
| Example 22 | Preparation Example 2 | 30 | A150 | 50 | — | 0 | 50 | 140 or more | ○ | 0.52 | ○ |

TABLE 3

| | Formulation | | | | | | Test results | | | | |
|---|---|---|---|---|---|---|---|---|---|---|---|
| | (B) Acrylic ester graft copolymer | | (C) Aromatic polyester | | Other additives | | Izod impact strength | Du Pont impact strength | Thermal stability | Solvent resistance | Jet-black color property |
| | Kind | Blended amount | Kind | Blended amount | Kind | Blended amount | kg · cm/cm (−30° C.) | kg · cm (−30° C.) | | | |
| Comparative Example 7 | KM330 | 10 | N1300 | 50 | — | 0 | 15 | 110 | x | 0.50 | x |
| Comparative Example 8 | Preparation Example 4 | 30 | N1000 | 35 | — | 0 | 25 | 120 | ○ | 0.52 | ○ |
| Comparative Example 9 | KM330 | 20 | MA523 | 70 | — | 0 | 20 | 130 | x | 0.65 | x |
| Comparative Example 10 | Preparation Example 1 | 100 | AA200 | 150 | — | 0 | No molded product due to excessive softness | | | | |
| Comparative Example 11 | Preparation Example 2 | 30 | N1300 | 100 | Epoxy resin | 15 | No molded product due to thermal deterioration | | | | |
| Comparative Example 12 | Preparation Example 1 | 0.5 | N1000 | 70 | — | 0 | 5 | 20 | ○ | 0.35 | ○ |
| Comparative Example 13 | Preparation Example 3 | 30 | MA523 | 3 | — | 0 | 57 | 140 or more | ○ | 0.57 | ○ |
| Comparative Example 14 | Preparation Example 5 | 30 | N1300 | 50 | — | 0 | 15 | 140 or more | ○ | 0.57 | ○ |
| Comparative Example 15 | KM330 | 30 | N1300 | 50 | — | 0 | 17 | 140 or more | x | 0.55 | x |

As apparent from the above-described results, the polycarbonate resin composition of the present invention is excellent in both Izod impact strength at −30° C. and Du Pont impact strength at −30° C. and in thermal stability, solvent resistance and jet-black color property, but the compositions in Comparative Examples are inferior in some properties measured.

What is claimed is:

1. A polycarbonate resin composition comprising (A) 100 parts by weight of polycarbonate resin, and (B) 1 to 80 parts by weight of an acrylic ester graft copolymer, said acrylic ester graft copolymer being produced by grafting on 100 parts by weight of an acrylic ester copolymer produced by copolymerizing (i) 100 parts by weight of at least one acrylic ester monomer having 1 to 16 carbon atoms (ii) 0.1 to 5 parts by weight of a first polyfunctional ester monomer selected from the group consisting of a polyfunctional allyl ester monomer having a benzene ring as a skeleton, a polyfunctional methallyl ester monomer having a benzene ring as a skeleton and a mixture thereof; a copolymer comprising (iii) 15 to 100 parts by weight of (a) one or two vinyl monomers selected from the group consisting of a methacrylic ester, an aromatic monovinyl compound and a vinyl cyanide compound, and (b) an acrylic ester in an amount of 0 to 20% by weight to the vinyl monomer and (iv) 0.1 to 5 parts by weight of a second polyfunctional ester monomer selected from the group consisting of a polyfunctional allyl ester monomer having a benzene ring as a skeleton, a polyfunctional methallyl ester monomer having a benzene ring as a skeleton and a mixture thereof.

2. A polycarbonate resin composition comprising (A) 100 parts by weight of a polycarbonate resin, (B) 1 to 80 parts by weight of an acrylic ester graft copolymer, said acrylic ester graft copolymer produced by grafting on 100 parts by weight of an acrylic ester copolymer produced by copolymerizing (i) 100 parts by weight of at least one acrylic ester monomer having 1 to 16 carbon atoms and (ii) 0.1 to 5 parts by weight of a first polyfunctional ester monomer selected from the group consisting of a polyfunctional allyl ester monomer having a benzene ring as a skeleton, a polyfunctional methallyl ester monomer having a benzene ring as a skeleton and a mixture thereof; a copolymer comprising (iii) 15 to 100 parts by weight of (a) one or two vinyl monomers selected from the group consisting of a methacrylic ester, an aromatic monovinyl compound and a vinyl cyanide compound, (b) and an acrylic ester in a proportion of 0 to 20% by weight to the vinyl monomer and (iv) 0.1 to 5 parts by weight of a second polyfunctional ester monomer selected from the group consisting of a polyfunctional allyl ester monomer having a benzene ring as a skeleton, a polyfunctional methallyl ester monomer having a benzene ring as a skeleton and a mixture thereof, and (C) 4 to 150 parts by weight of an aromatic polyester resin.

3. The polycarbonate resin composition according to claim 1 or 2, wherein said polycarbonate resin (A) is a polymer having a repeating unit represented by the formula (I):

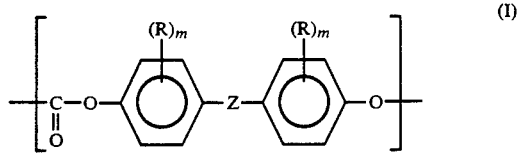
(I)

wherein Z is a single bond, an ether bond, an alkylene group having 1 to 8 carbon atoms, an alkylidene group having 2 to 8 carbon atoms, a cycloalkylidene group having 5 to 15 carbon atoms, a sulfonyl group, a carbonyl group or a group represented by the following formula:

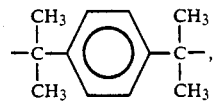

and R represents a hydrogen atom, a chlorine atom, a bromine atom or an alkyl group having 1 to 8 carbon atoms, and m denotes 0 or an integer of 1 to 4.

4. The polycarbonate resin composition according to claim 1 or 2, wherein for said (B) (i), said acrylic ester monomer having 1 to 16 carbon atoms is at least one compound selected from the group consisting of ethyl acrylate, butyl acrylate, 2-ethylhexyl acrylate, n-octyl acrylate, isononyl acrylate, methoxyethyl acrylate and hydroxyethyl acrylate.

5. The polycarbonate resin composition according to claim 1 or 2, wherein said (B) (ii) is a polyfunctional allyl ester monomer having a benzene ring as a skeleton selected from the group consisting of diallyl phthalate, diallyl isophthalate, diallyl terephthalate, triallyl trimellitate, triallyl trimesate and tetraallyl pyromellitate.

6. The polycarbonate resin composition according to claim 1 or 2, wherein said (B) (ii) is a polyfunctional methallyl ester monomer having a benzene ring as a skeleton selected from the group consisting of dimethallyl phthalate, dimethallyl isophthalate, dimethallyl terephthalate, trimethallyl trimellitate, trimethallyl trimesate and tetramethallyl pyromellitate.

7. The polycarbonate resin composition according to claim 1 or 2, wherein said (B) (iii) is a methacrylic ester selected from the group consisting of methyl methacrylate, ethyl methacrylate, butyl methacrylate, methoxyethyl methacrylate and glycidyl methacrylate.

8. The polycarbonate resin composition according to claim 1 or 2, wherein said (B) (iii) is an aromatic monovinyl compound selected from the group consisting of unsubstituted styrene, α-methylstyrene, vinyltoluene, vinylxylene and a halogenated styrene.

9. The polycarbonate resin composition according to claim 1 or 2, wherein said (B) (iii) is a vinyl cyanide compound selected from the group consisting of acrylonitrile and methacrylonitrille.

10. The polycarbonate resin composition according to claim 2, wherein said aromatic polyester resin (C) is a polyester resin obtained by polycondensation of a bifunctional carboxylic acid component and an alkylene glycol component.

11. The polycarbonate resin composition according to claim 10, wherein said bifunctional carboxylic acid component is selected from the group consisting of terephthalic acid, isophthalic acid and naphthalene dicarboxylic acid.

12. The polycarbonate resin composition according to claim 10, wherein said alkylene glycol component is selected from the group consisting of ethylene glycol, 1,4-cyclohexane dimethanol and butylene glycol.

13. The polycarbonate resin composition according to claim 1 or 2, which further comprises 0.01 to 10 parts by weight of an epoxy resin as component (D).

14. The polycarbonate resin composition according to claim 13, wherein said epoxy resin is a polycondensate comprising an aromatic diol and an epihalohydrin.

15. The polycarbonate resin according to claim 1, wherein said polycarbonate resin (A) is a polymer having a repeating unit of the formula (I):

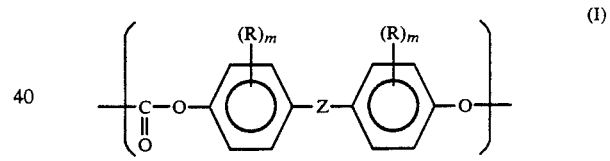
(I)

wherein Z is a single bond, an ether bond, an alkylene group having 1 to 8 carbon atoms, an alkylidene group having 2 to 8 carbon atoms, a cycloalkylidene group having 5 to 15 carbon atoms, a sulfonyl group, a carbonyl group or a group of the following formula:

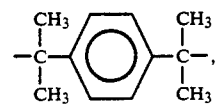

and R is a hydrogen atom, a chlorine atom, a bromine atom or an alkyl group having 1 to 8 carbon atoms, and m is 0 or an integer of 1 to 4 and having a viscosity average molecular weight of 10,000 to 100,000;

said (B) is present in an amount of 2 to 60 parts by weight and has a particle diameter of 0.1 to 0.3 mm;

said acrylic acid monomer (B) (i) is a compound selected from the group consisting of ethyl acrylate, butyl acrylate, 2-ethylhexyl acrylate, n-octyl acrylate, isononyl acrylate, methoxyethyl acrylate and hydroxyethyl acrylate; said (B) (ii) and (B) (iv) independently of each other are selected from the group consisting of diallyl phthalate, diallyl isophthalate diallyl terephthalate, triallyl trimellitate, triallyl trimesate, tetrallyl pyromellitate, dimethallyl phthalate, dimethallyl isophthalate, dimethallyl terephthalate, trimethallyl trimellitate, trimethallyl trimesate and tetramethallyl pyromellitate; and said vinyl monomer (B) (iii) is present in an amount of 20 to 50 parts by weight and is selected from the group consisting of methyl methacrylate, ethyl methacrylate, butyl methacrylate, methoxyethyl methacrylate, glycidyl methacrylate, unsubstituted styrene, α-methylstyrene, vinyltoluene, vinylxylene, a halogenated styrene, acrylonitrile and methacrylonitrile.

16. The polycarbonate resin according to claim 2, wherein said polycarbonate resin (A) is a polymer having a repeating unit of the formula (I):

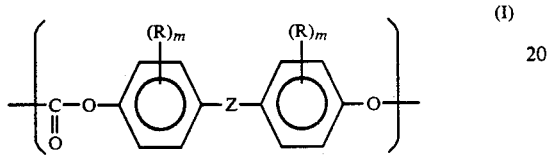

wherein Z is a single bond, an ether bond, an alkylene group having 1 to 8 carbon atoms, an alkylidene group having 2 to 8 carbon atoms, a cycloalkylidene group having 5 to 15 carbon atoms, a sulfonyl group, a carbonyl group or a group of the following formula:

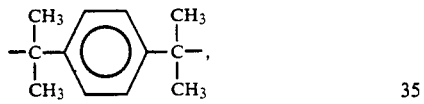

and R is a hydrogen atom, a chlorine atom, a bromine atom or an alkyl group having 1 to 8 carbon atoms, and m denotes 0 or an integer of 1 to 4 and having a viscosity average molecular weight of 10,000 to 100,000;

said (B) is present in an amount of 2 to 60 parts by weight and has a particle diameter of 0.1 to 0.3 mm;

said acrylic acid monomer (B) (i) is a compound selected from the group consisting of ethyl acrylate, butyl acrylate, 2-ethylhexyl acrylate, n-octyl acrylate, isononyl acrylate, methoxyethyl acrylate and hydroxyethyl acrylate; said (B) (ii) and (B) (iv) independently of each other are selected from the group consisting of diallyl phthalate, diallyl isophthalate diallyl terephthalate, triallyl trimellitate, triallyl trimesate, tetrallyl pyromellitate, dimethallyl phthalate, dimethallyl isophthalate, dimethallyl terephthalate, trimethallyl trimellitate, trimethallyl trimesate and tetramethallyl pyromellitate; and said vinyl monomer (B) (iii) is present in an amount of 20 to 50 parts by weight and is selected from the group consisting of methyl methacrylate, ethyl methacrylate, butyl methacrylate, methoxyethyl methacrylate, glycidyl methacrylate, unsubstituted styrene, α-methylstyrene, vinyltoluene, vinylxylene, a halogenated styrene, acrylonitrile and methacrylonitrile; and said aromatic polyester resin (C) is present in an amount of 4 to 150 parts by weight and is obtained by a polycondensation of (1) a bifunctional carboxylic acid component selected from the group consisting of terephthalic acid, isophthalic acid and naphthalene dicarboxylic acid and (2) an alkylene glycol component selected from the group consisting of ethylene glycol, 1,4-cyclohexane dimethanol and butylene glycol.

* * * * *